(12) United States Patent
Briggs et al.

(10) Patent No.: US 10,055,768 B2
(45) Date of Patent: Aug. 21, 2018

(54) INTERACTIVE PRODUCT PLACEMENT SYSTEM AND METHOD THEREFOR

(71) Applicant: Cinsay, Inc., Dallas, TX (US)

(72) Inventors: Christian Briggs, Austin, TX (US); Heath McBurnett, Aliso Viejo, CA (US); Delfino Galindo, Jr., Laguna Niguel, CA (US); Freddy Knuth, Euless, TX (US)

(73) Assignee: Cinsay, Inc., Dallas, TX (US)

( * ) Notice: Subject to any disclaimer, the term of this patent is extended or adjusted under 35 U.S.C. 154(b) by 0 days.

(21) Appl. No.: 14/079,385

(22) Filed: Nov. 13, 2013

(65) Prior Publication Data

US 2014/0095330 A1 Apr. 3, 2014

Related U.S. Application Data

(63) Continuation of application No. 12/787,505, filed on May 26, 2010, which is a continuation-in-part of application No. 12/363,713, filed on Jan. 30, 2009, now Pat. No. 8,312,486.

(60) Provisional application No. 61/024,829, filed on Jan. 30, 2008.

(51) Int. Cl.
*G06Q 30/02* (2012.01)

(52) U.S. Cl.
CPC ..... *G06Q 30/0277* (2013.01); *G06Q 30/0251* (2013.01)

(58) Field of Classification Search
None
See application file for complete search history.

(56) References Cited

U.S. PATENT DOCUMENTS

| | | |
|---|---|---|
| 5,264,933 A | 11/1993 | Rosser et al. |
| 5,600,775 A | 2/1997 | King et al. |
| 5,675,511 A | 10/1997 | Prasad et al. |
| 5,774,664 A | 6/1998 | Hidary et al. |
| 5,778,181 A | 7/1998 | Hidary et al. |
| 5,903,816 A | 5/1999 | Broadwin et al. |
| 5,929,849 A | 7/1999 | Kikinis |

(Continued)

FOREIGN PATENT DOCUMENTS

| | | |
|---|---|---|
| CN | 101286253 A | 10/2008 |
| CN | 101647035 A | 2/2010 |

(Continued)

OTHER PUBLICATIONS

Notification of Transmittal of the International Search Report and the Written Opinion of the International Searching Authority, or the Declaration dated Jun. 24, 2011 in connection with International Patent Application No. PCT/US10/57567.

(Continued)

*Primary Examiner* — Nathan Flynn
*Assistant Examiner* — Christine Kurien
(74) *Attorney, Agent, or Firm* — N W Poulsen; G N Ranganathan

(57) ABSTRACT

A method for facilitating the order of commercial products in connection with the display of media content, whereby a player comprises a media production component and an interactive e-commerce component embedded therein. The player with the e-commerce component can be virally copied and propagated from one web page to any number of other web pages.

30 Claims, 10 Drawing Sheets

(56) References Cited

U.S. PATENT DOCUMENTS

| | | |
|---|---|---|
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,058,430 A | 5/2000 | Kaplan |
| 6,141,060 A | 10/2000 | Honey et al. |
| 6,154,771 A | 11/2000 | Rangan et al. |
| 6,169,573 B1 | 1/2001 | Sampath-Kumar et al. |
| 6,173,317 B1 | 1/2001 | Chaddha et al. |
| 6,182,116 B1 | 1/2001 | Namma et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,496,981 B1 | 2/2002 | Wistendahl et al. |
| 6,357,042 B2 | 3/2002 | Srinivasan et al. |
| 6,510,557 B1 | 1/2003 | Thrift |
| 6,536,041 B1 | 3/2003 | Knudson et al. |
| 6,553,566 B1 | 4/2003 | Grant et al. |
| 6,564,380 B1 | 5/2003 | Murphy |
| 6,628,307 B1 | 9/2003 | Fair |
| 6,757,906 B1 | 6/2004 | Look et al. |
| 6,766,528 B1 | 7/2004 | Kim et al. |
| 6,792,618 B1 | 9/2004 | Bendinelli et al. |
| 6,847,778 B1 | 1/2005 | Vallone et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,076,792 B2 | 7/2006 | Zigmond et al. |
| 7,120,871 B1 | 10/2006 | Harrington |
| 7,133,837 B1 | 11/2006 | Barnes, Jr. |
| 7,136,853 B1 | 11/2006 | Kohda et al. |
| 7,146,631 B1 | 12/2006 | Tanaka et al. |
| 7,158,676 B1 | 1/2007 | Rainsford |
| 7,162,263 B2 | 1/2007 | King et al. |
| 7,168,051 B2 | 1/2007 | Robinson et al. |
| 7,168,087 B2 | 1/2007 | Goldberg et al. |
| 7,188,186 B1 | 3/2007 | Meyer et al. |
| 7,203,909 B1 | 4/2007 | Horvitz et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,257,774 B2 | 8/2007 | Denoue et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,355,633 B2 | 4/2008 | Kurosawa et al. |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,559,017 B2 | 7/2009 | Datar et al. |
| 7,559,034 B1 | 7/2009 | Paperny et al. |
| 7,574,381 B1 | 8/2009 | Lin-Hendel |
| 7,577,978 B1 | 8/2009 | Wistendahl et al. |
| 7,593,965 B2 | 9/2009 | Gabriel |
| 7,600,241 B2 | 10/2009 | Zigmond et al. |
| 7,607,107 B2 | 10/2009 | Iten et al. |
| 7,613,691 B2 | 11/2009 | Finch |
| 7,614,013 B2 | 11/2009 | Dollar et al. |
| 7,620,914 B2 | 11/2009 | Li et al. |
| 7,624,416 B1 | 11/2009 | Vandermolen et al. |
| 7,631,327 B2 | 12/2009 | Dempski et al. |
| 7,653,923 B2 | 1/2010 | Flickinger |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,698,178 B2 | 4/2010 | Chu |
| 7,721,307 B2 | 5/2010 | Hendricks et al. |
| 7,735,101 B2 | 6/2010 | Lanza et al. |
| 7,739,596 B2 | 6/2010 | Clarke-Martin et al. |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,800,102 B2 | 9/2010 | Park et al. |
| 7,804,506 B2 | 9/2010 | Bates et al. |
| 7,818,763 B2 | 10/2010 | Sie et al. |
| 7,823,058 B2 | 10/2010 | Pea et al. |
| 7,840,415 B2 | 11/2010 | Schifone |
| 7,870,592 B2 | 1/2011 | Hudson et al. |
| 7,885,951 B1 | 2/2011 | Rothschild |
| 7,899,719 B2 | 3/2011 | Lin-Hendel |
| 7,912,753 B2 | 3/2011 | Struble |
| 7,923,722 B2 | 4/2011 | Ryu et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B2 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,112,702 B2 | 2/2012 | Badoiu et al. |
| 8,113,844 B2 | 2/2012 | Hunag et al. |
| 8,117,281 B2 | 2/2012 | Robinson et al. |
| 8,122,480 B2 | 2/2012 | Sholtis |
| 8,132,486 B1 | 3/2012 | Calvert |
| 8,140,973 B2 | 3/2012 | Sandquist et al. |
| 8,141,112 B2 | 3/2012 | Cope et al. |
| 8,151,182 B2 | 4/2012 | Datar et al. |
| 8,151,295 B1 | 4/2012 | Eldering et al. |
| 8,181,212 B2 | 5/2012 | Sigal |
| 8,196,162 B2 | 6/2012 | van de Klashorst |
| 8,234,218 B2 | 7/2012 | Robinson et al. |
| 8,244,830 B2 | 8/2012 | Robinson et al. |
| 8,310,443 B1 | 11/2012 | Pan |
| 8,312,486 B1 | 11/2012 | Briggs et al. |
| 8,316,450 B2 | 11/2012 | Robinson et al. |
| 8,341,152 B1 | 12/2012 | Bates |
| 8,356,077 B2 | 1/2013 | Robinson et al. |
| 8,365,081 B1 | 1/2013 | Amacker et al. |
| 8,413,182 B2 | 4/2013 | Bill |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller |
| 8,533,753 B2 | 9/2013 | Briggs et al. |
| 8,549,555 B2 | 10/2013 | Briggs et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |

(56) References Cited

U.S. PATENT DOCUMENTS

| | | | |
|---|---|---|---|
| 8,655,146 B2 | 2/2014 | Bennett et al. | |
| 8,666,818 B2 | 3/2014 | DeVree | |
| 8,682,809 B2 | 3/2014 | Avedissian et al. | |
| 8,707,185 B2 | 4/2014 | Robinson et al. | |
| 8,708,223 B2 | 4/2014 | Gates et al. | |
| 8,725,826 B2 | 5/2014 | Robinson et al. | |
| 8,745,657 B2 | 6/2014 | Chalozin et al. | |
| 8,752,083 B2 | 6/2014 | Geer, III et al. | |
| 8,769,016 B2 | 7/2014 | Jakobson | |
| 8,769,053 B2 | 7/2014 | Spitz et al. | |
| 8,769,584 B2 | 7/2014 | Neumeier et al. | |
| 8,782,690 B2 | 7/2014 | Briggs et al. | |
| 8,813,118 B2 | 8/2014 | Bhatnagar et al. | |
| 8,813,132 B2 | 8/2014 | Andrews, II et al. | |
| 8,843,959 B2 | 9/2014 | McMaster et al. | |
| 8,893,173 B2 | 11/2014 | Briggs et al. | |
| 8,918,804 B2 | 12/2014 | Sinha et al. | |
| 9,036,043 B2 | 5/2015 | Segal | |
| 9,351,032 B2 | 5/2016 | Briggs et al. | |
| 9,674,584 B2 | 6/2017 | Briggs et al. | |
| 2002/0006266 A1 | 1/2002 | Yoon et al. | |
| 2002/0007493 A1 | 1/2002 | Butler et al. | |
| 2002/0056123 A1 | 5/2002 | Liwerant et al. | |
| 2002/0056136 A1 | 5/2002 | Wistendahl et al. | |
| 2002/0059196 A1 | 5/2002 | I'Anson et al. | |
| 2002/0062481 A1 | 5/2002 | Slaney et al. | |
| 2002/0066103 A1* | 5/2002 | Gagnon | G06Q 30/06 725/60 |
| 2002/0073167 A1 | 6/2002 | Powell et al. | |
| 2002/0075332 A1 | 6/2002 | Geilfuss, Jr. et al. | |
| 2002/0083447 A1* | 6/2002 | Heron | H04N 5/44543 725/38 |
| 2002/0083469 A1 | 6/2002 | Jeannin et al. | |
| 2002/0087978 A1 | 7/2002 | Nicholson et al. | |
| 2002/0112249 A1 | 8/2002 | Hendricks et al. | |
| 2002/0126990 A1 | 9/2002 | Rasmussen et al. | |
| 2002/0199181 A1 | 12/2002 | Allen | |
| 2003/0018966 A1 | 1/2003 | Cook et al. | |
| 2003/0023490 A1 | 1/2003 | Lenyon et al. | |
| 2003/0028873 A1 | 2/2003 | Lemmons | |
| 2003/0040962 A1 | 2/2003 | Lewis | |
| 2003/0055723 A1 | 3/2003 | English | |
| 2003/0079224 A1 | 4/2003 | Komar et al. | |
| 2003/0084441 A1 | 5/2003 | Hunt | |
| 2003/0115598 A1 | 6/2003 | Pantoja | |
| 2003/0135563 A1 | 7/2003 | Bodin et al. | |
| 2003/0149983 A1 | 8/2003 | Markel | |
| 2003/0163832 A1 | 8/2003 | Tsuria et al. | |
| 2003/0228615 A1 | 12/2003 | Rossi et al. | |
| 2003/0231851 A1 | 12/2003 | Rantala et al. | |
| 2004/0012717 A1 | 1/2004 | Sprague et al. | |
| 2004/0021684 A1 | 2/2004 | Millner | |
| 2004/0021685 A1 | 2/2004 | Denoue et al. | |
| 2004/0059783 A1 | 3/2004 | Kazui et al. | |
| 2004/0075670 A1 | 4/2004 | Bezine et al. | |
| 2004/0080625 A1 | 4/2004 | Kurosawa et al. | |
| 2004/0125133 A1 | 7/2004 | Pea et al. | |
| 2004/0153385 A1 | 8/2004 | Allibhoy et al. | |
| 2005/0005303 A1 | 1/2005 | Barone et al. | |
| 2005/0022226 A1 | 1/2005 | Ackley et al. | |
| 2005/0029514 A1 | 2/2005 | Moriya | |
| 2005/0033656 A1 | 2/2005 | Wang et al. | |
| 2005/0076372 A1 | 4/2005 | Moore et al. | |
| 2005/0091107 A1 | 4/2005 | Blum | |
| 2005/0094031 A1 | 5/2005 | Tecot et al. | |
| 2005/0097622 A1 | 5/2005 | Zigmond et al. | |
| 2005/0144164 A1 | 6/2005 | Gorak et al. | |
| 2005/0234958 A1 | 10/2005 | Sipusic et al. | |
| 2005/0246752 A1 | 11/2005 | Liwerant et al. | |
| 2006/0009243 A1 | 1/2006 | Dahan et al. | |
| 2006/0010476 A1 | 1/2006 | Kelly et al. | |
| 2006/0047779 A1 | 3/2006 | Deshpande | |
| 2006/0087987 A1 | 4/2006 | Witt et al. | |
| 2006/0089843 A1 | 4/2006 | Flather | |
| 2006/0117356 A1 | 6/2006 | Jojic et al. | |
| 2006/0136305 A1 | 6/2006 | Fitzsimmons et al. | |
| 2006/0202191 A1 | 9/2006 | Gerlach et al. | |
| 2006/0212794 A1 | 9/2006 | Evans et al. | |
| 2006/0242016 A1 | 10/2006 | Chenard | |
| 2006/0256133 A1 | 11/2006 | Rosenberg | |
| 2006/0264209 A1 | 11/2006 | Atkinson et al. | |
| 2006/0265657 A1 | 11/2006 | Gilley | |
| 2006/0276266 A1 | 12/2006 | Sullivan | |
| 2007/0003223 A1 | 1/2007 | Armstrong et al. | |
| 2007/0005795 A1 | 1/2007 | Gonzalez | |
| 2007/0030080 A1 | 2/2007 | Han et al. | |
| 2007/0033531 A1 | 2/2007 | Marsh | |
| 2007/0046687 A1 | 3/2007 | Soroushi et al. | |
| 2007/0073553 A1 | 3/2007 | Flinn et al. | |
| 2007/0087489 A1 | 4/2007 | Park et al. | |
| 2007/0091093 A1 | 4/2007 | Li et al. | |
| 2007/0091095 A1 | 4/2007 | Chen | |
| 2007/0106646 A1 | 5/2007 | Stern et al. | |
| 2007/0150360 A1 | 6/2007 | Getz | |
| 2007/0157228 A1 | 7/2007 | Bayer et al. | |
| 2007/0180461 A1 | 8/2007 | Hilton | |
| 2007/0183430 A1 | 8/2007 | Asmussen | |
| 2007/0204308 A1* | 8/2007 | Nicholas | H04N 7/17318 725/86 |
| 2007/0239546 A1 | 10/2007 | Blum et al. | |
| 2007/0241327 A1 | 10/2007 | Kim et al. | |
| 2007/0242066 A1 | 10/2007 | Rosenthal | |
| 2007/0245243 A1 | 10/2007 | Lanza et al. | |
| 2007/0250899 A1 | 10/2007 | Rhodes et al. | |
| 2007/0250901 A1 | 10/2007 | McIntire et al. | |
| 2007/0266399 A1 | 11/2007 | Sidi | |
| 2007/0271149 A1 | 11/2007 | Siegel et al. | |
| 2007/0288518 A1* | 12/2007 | Crigler | G06F 17/30038 |
| 2007/0300263 A1 | 12/2007 | Barton et al. | |
| 2007/0300280 A1 | 12/2007 | Turner et al. | |
| 2008/0005999 A1 | 1/2008 | Pervan | |
| 2008/0012010 A1 | 1/2008 | Myung-Seok et al. | |
| 2008/0028047 A1 | 1/2008 | Girouard et al. | |
| 2008/0066099 A1 | 3/2008 | Brodersen et al. | |
| 2008/0066107 A1 | 3/2008 | Moonka et al. | |
| 2008/0097843 A1 | 4/2008 | Menon et al. | |
| 2008/0098425 A1 | 4/2008 | Welch | |
| 2008/0109306 A1 | 5/2008 | Maigret et al. | |
| 2008/0109844 A1 | 5/2008 | Baideschwieler et al. | |
| 2008/0114656 A1 | 5/2008 | Jersey et al. | |
| 2008/0115161 A1 | 5/2008 | Kurzion | |
| 2008/0126191 A1 | 5/2008 | Schiavi | |
| 2008/0126226 A1 | 5/2008 | Popkiewicz et al. | |
| 2008/0126949 A1 | 5/2008 | Sharma | |
| 2008/0148283 A1 | 6/2008 | Allen et al. | |
| 2008/0149921 A1 | 6/2008 | Choi et al. | |
| 2008/0155590 A1 | 6/2008 | Soukup et al. | |
| 2008/0162343 A1 | 7/2008 | Bedier | |
| 2008/0163283 A1* | 7/2008 | Tan | H04N 7/163 725/20 |
| 2008/0177627 A1 | 7/2008 | Cefail | |
| 2008/0177630 A1 | 7/2008 | Maghfourian et al. | |
| 2008/0187279 A1 | 8/2008 | Gilley et al. | |
| 2008/0235085 A1* | 9/2008 | Kovinsky | G06Q 30/02 705/14.49 |
| 2008/0250445 A1 | 10/2008 | Zigmond et al. | |
| 2008/0255934 A1 | 10/2008 | Leventhal et al. | |
| 2008/0263583 A1 | 10/2008 | Heath | |
| 2008/0276266 A1 | 11/2008 | Huchital et al. | |
| 2008/0276272 A1 | 11/2008 | Rajaraman et al. | |
| 2008/0281685 A1 | 11/2008 | Jaffe et al. | |
| 2008/0281689 A1 | 11/2008 | Blinnikka et al. | |
| 2008/0294694 A1 | 11/2008 | Maghfourian et al. | |
| 2008/0296568 A1 | 12/2008 | Ryu et al. | |
| 2008/0306999 A1 | 12/2008 | Finger et al. | |
| 2008/0307310 A1 | 12/2008 | Segal et al. | |
| 2008/0319852 A1 | 12/2008 | Gardner et al. | |
| 2008/0319856 A1 | 12/2008 | Zito et al. | |
| 2009/0006191 A1 | 1/2009 | Arankalle et al. | |
| 2009/0013347 A1 | 1/2009 | Ahanger et al. | |
| 2009/0018904 A1 | 1/2009 | Shipman et al. | |
| 2009/0024617 A1 | 1/2009 | Cope | |
| 2009/0031382 A1 | 1/2009 | Cope | |
| 2009/0032007 A1 | 2/2009 | Satou | |

(56) References Cited

U.S. PATENT DOCUMENTS

| | | |
|---|---|---|
| 2009/0032809 A1 | 2/2009 | Kim et al. |
| 2009/0043674 A1 | 2/2009 | Minsky et al. |
| 2009/0070206 A1 | 3/2009 | Sengamedu |
| 2009/0077598 A1 | 3/2009 | Watson et al. |
| 2009/0083815 A1 | 3/2009 | McMaster et al. |
| 2009/0089146 A1 | 4/2009 | Teterin |
| 2009/0092374 A1 | 4/2009 | Kulas |
| 2009/0094339 A1 | 4/2009 | Allen et al. |
| 2009/0094555 A1 | 4/2009 | Vitala |
| 2009/0106104 A1 | 4/2009 | Upendran et al. |
| 2009/0119169 A1* | 5/2009 | Chandratillake . G06F 17/30796 705/14.46 |
| 2009/0132349 A1 | 5/2009 | Berkley et al. |
| 2009/0148843 A1 | 6/2009 | Schulze-Koops et al. |
| 2009/0150947 A1 | 6/2009 | Soderstrom |
| 2009/0157500 A1 | 6/2009 | Ames et al. |
| 2009/0158322 A1 | 6/2009 | Cope et al. |
| 2009/0172793 A1 | 7/2009 | Newstadt et al. |
| 2009/0199230 A1* | 8/2009 | Kumar et al. ............... 725/32 |
| 2009/0210790 A1 | 8/2009 | Thomas |
| 2009/0222851 A1 | 9/2009 | Talmi |
| 2009/0248546 A1 | 10/2009 | Norris et al. |
| 2009/0249185 A1 | 10/2009 | Datar et al. |
| 2009/0259563 A1 | 10/2009 | Ruhnke et al. |
| 2009/0265255 A1 | 10/2009 | Jackson et al. |
| 2009/0274437 A1 | 11/2009 | Stiers et al. |
| 2009/0276805 A1 | 11/2009 | Andrews, II et al. |
| 2009/0320073 A1 | 12/2009 | Reisman |
| 2009/0328113 A1 | 12/2009 | van de Klashorst |
| 2010/0030578 A1 | 2/2010 | Siddique et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0161425 A1 | 6/2010 | Sideman |
| 2010/0177122 A1 | 7/2010 | Netter et al. |
| 2010/0199182 A1 | 8/2010 | Lanza et al. |
| 2010/0223107 A1 | 9/2010 | Kim et al. |
| 2010/0247061 A1 | 9/2010 | Bennett et al. |
| 2010/0279766 A1 | 11/2010 | Pllska et al. |
| 2010/0283827 A1 | 11/2010 | Bustamente |
| 2010/0287580 A1 | 11/2010 | Harding et al. |
| 2010/0299616 A1 | 11/2010 | Chen et al. |
| 2010/0306805 A1 | 12/2010 | Neumeier et al. |
| 2010/0332329 A1 | 12/2010 | Roberts et al. |
| 2011/0001758 A1 | 1/2011 | Chalozin et al. |
| 2011/0004517 A1 | 1/2011 | Soto et al. |
| 2011/0016487 A1 | 1/2011 | Chalozin et al. |
| 2011/0022471 A1 | 1/2011 | Brueck et al. |
| 2011/0052144 A1* | 3/2011 | Abbas et al. ............... 386/240 |
| 2011/0071865 A1 | 3/2011 | Leeds et al. |
| 2011/0106879 A1 | 5/2011 | Sung et al. |
| 2011/0107363 A1 | 5/2011 | Sanghavi |
| 2011/0125594 A1 | 5/2011 | Brown et al. |
| 2011/0133176 A1 | 6/2011 | Lee et al. |
| 2011/0166944 A1 | 7/2011 | Tkachev |
| 2011/0173300 A1 | 7/2011 | Levy et al. |
| 2011/0191178 A1 | 8/2011 | Newberg et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2012/0030704 A1 | 2/2012 | Schiller et al. |
| 2012/0079021 A1 | 3/2012 | Roman et al. |
| 2012/0158511 A1 | 6/2012 | Lucero et al. |
| 2012/0159541 A1 | 6/2012 | Carton et al. |
| 2012/0185355 A1 | 7/2012 | Kilroy |
| 2012/0192104 A1 | 7/2012 | Robbin et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0304065 A1 | 11/2012 | Cai |
| 2012/0307152 A1 | 12/2012 | Zaslaysky et al. |
| 2013/0014137 A1 | 1/2013 | Bhatia et al. |
| 2013/0014155 A1 | 1/2013 | Clarke et al. |
| 2013/0054757 A1 | 2/2013 | Spitz et al. |
| 2013/0097023 A1 | 4/2013 | Yerli |
| 2013/0110608 A1 | 5/2013 | Cassidy et al. |
| 2013/0117131 A1 | 5/2013 | Robinson et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0166382 A1 | 6/2013 | Cassidy et al. |
| 2013/0174007 A1 | 7/2013 | Demarco et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0254018 A1 | 9/2013 | Rao |
| 2013/0290550 A1 | 10/2013 | Bangalore et al. |
| 2014/0006156 A1 | 1/2014 | Theophilis |
| 2014/0019860 A1 | 1/2014 | Sathish et al. |
| 2014/0032366 A1 | 1/2014 | Spitz et al. |
| 2014/0095330 A1 | 4/2014 | Briggs et al. |
| 2014/0101551 A1 | 4/2014 | Sherrets et al. |
| 2014/0115631 A1 | 4/2014 | Mak |
| 2014/0181208 A1 | 6/2014 | Robinson et al. |
| 2014/0208235 A1 | 7/2014 | Robinson et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0282724 A1 | 9/2014 | Chalozin et al. |
| 2014/0304730 A1 | 10/2014 | Lettau et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |
| 2015/0189355 A1 | 7/2015 | Korbecki |
| 2015/0264417 A1 | 9/2015 | Spitz et al. |
| 2016/0029070 A1 | 1/2016 | Briggs et al. |
| 2016/0029071 A1 | 1/2016 | Briggs et al. |
| 2016/0029072 A1 | 1/2016 | Briggs et al. |
| 2016/0029073 A1 | 1/2016 | Briggs et al. |
| 2016/0029090 A1 | 1/2016 | Briggs et al. |
| 2016/0191981 A1 | 6/2016 | Briggs et al. |
| 2016/0191982 A1 | 6/2016 | Briggs et al. |
| 2016/0191983 A1 | 6/2016 | Briggs et al. |
| 2016/0191984 A1 | 6/2016 | Briggs et al. |
| 2016/0192031 A1 | 6/2016 | Briggs et al. |

FOREIGN PATENT DOCUMENTS

| | | | |
|---|---|---|---|
| CN | 101699505 A | 4/2010 | |
| EA | 011996 | 6/2009 | |
| EP | 2045730 A1 | 4/2009 | |
| RU | 2355043 | 5/2009 | |
| RU | 89738 | 12/2009 | |
| WO | WO 01/69364 A2 | 9/2001 | |
| WO | WO 01/91869 A2 | 12/2001 | |
| WO | WO 2005/036875 A1 | 4/2005 | |
| WO | WO 2006/062105 | 6/2006 | |
| WO | 2007131132 | 11/2007 | |
| WO | WO 2008/016634 A2 | 2/2008 | |
| WO | WO 2008016634 A2 * | 2/2008 | ............ G06Q 30/00 |
| WO | WO 2009/012580 A1 | 1/2009 | |
| WO | WO 2009/137368 | 11/2009 | |
| WO | WO 2011/149491 A1 | 12/2011 | |
| WO | WO 2013/033239 A1 | 3/2013 | |
| WO | WO 2013/192557 A2 | 12/2013 | |
| WO | WO 2015/013117 A2 | 1/2015 | |
| WO | WO 2015/038795 A1 | 3/2015 | |
| WO | WO 2015/038798 A1 | 3/2015 | |
| WO | WO 2015/038802 A1 | 3/2015 | |
| WO | WO 2015/048375 A1 | 4/2015 | |
| WO | WO 2015/048377 A1 | 4/2015 | |
| WO | WO 2015/054644 A1 | 4/2015 | |

(56) References Cited

FOREIGN PATENT DOCUMENTS

| | | |
|---|---|---|
| WO | WO 2015/131126 A1 | 9/2015 |
| WO | WO 2015/138612 A1 | 9/2015 |

OTHER PUBLICATIONS

"Akamai for Media & Entertainment", Akamai Technologies, Inc., 2007, 38 pages.
"ebd Web Video Player, Increase Online Video Ad Monetization", www.ebdsoft.tv, 2010, 2 pages.
Notification of Transmittal of the International Search Report and the Written Opinion of the International Searching Authority, or the Declaration dated Nov. 14, 2012 in connection with International Patent Application No. PCT/US2012/52897.
"Content distributors can shopping-enable video content", www.web.archive.org, Apr. 27, 2007, 1 page.
Dan Kaplan, "Delivery Agent lets you buy products in your favorite TV shows", www.web.archive.org, May 4, 2007, 4 pages.
"Shopisodes Enable You to Dress Like Your Favorite TV Character", www.web.archive.org, Oct. 26, 2007, 1 page.
Jesse Liebman, "Reality TV That's Social, Bravo!", www.web.archive.org, Dec. 22, 2008, 6 pages.
Office Action dated Apr. 10, 2014 in connection with U.S. Appl. No. 14/042,477.
Office Action dated Apr. 11, 2014 in connection with U.S. Appl. No. 14/091,219.
Office Action dated Jul. 21, 2014 in connection with U.S. Appl. No. 14/091,219.
Office Action dated Jul. 9, 2014 in connection with U.S. Appl. No. 13/753,384.
Kongwah Wan, et al., "Advertising Insertion in Sports Webcasts", 2007 IEEE, p. 78-82.
Miguel Helft, "Google Aims to Make YouTube Profitable With Ads", The New York Times, Aug. 22, 2007, 3 pages.
Chris Tomlinson, "Google tries to relive past glories by making YouTube pay for itself", Birmingham Post, Sep. 4, 2007, 3 pages.
John Skidgel, "Producing Flash CS3 Video, Techniques for Video Pros and Web Designers", 2007, 9 pages.
Jan Krikke, "Streaming Video Transforms the Media Industry", IEEE, Jul./Aug. 2004, p. 6-12.
Tao Mei, et al., "VideoSense—Towards Effective Online Video Advertising", Sep. 23-28, 2007, p. 1075-1084.
Dr. Harry van Vliet, "Where Television and Internet meet . . . New experiences for rich media", Jan. 2002, 35 pages.
"IAB Announces Advertising Creative Guidelines for Online Broadband Video Commercials", Nov. 29, 2005, 4 pages.
"Digital Video In-Stream Ad Format Guidelines and Best Practices", Interactive Advertising Bureau, May 2008, 17 pages.
"Broadband Ad Creative Guidelines", Dec. 31, 2006, 3 pages.
Rich Media Guidelines: Fall 2004, Dec. 31, 2006, 3 pages.
"About Rich Media Guidelines Compliance: In-Page Units", Jan. 7, 2007, 2 pages.
"About Rich Media Guidelines Compliance: Over-the-Page Units", Jan. 7, 2007, 2 pages.
"Digital Video Ad Serving Template (VAST), Version 2.0", iab., Nov. 2009, 18 pages. (Redlined).
"Digital Video Ad Serving Template (VAST), Version 2.0", iab., Nov. 2009, 16 pages.
"DART Motif for In-Stream Helps Publishers Improve Efficiency, Push the Envelope with Video Ad Effects and Offer Advertisers Trusted, Reliable Reporting Metrics", Nov. 6, 2006, 3 pages.
"DoubleClick Debuts Video Ad-Serving Solution", Nov. 6, 2006, 2 pages.
Liz Gannes, "YouTube's New Inline Ads: Screenshots", May 11, 2007, 7 pages.
"Final Broadband Ad Creative Guidelines", Interactive Advertising Bureau, Standards & Guidelines, 4 pages.
Notification of Transmittal of the International Search Report and the Written Opinion of the International Searching Authority, or the Declaration dated Jan. 10, 2014 in connection with International Patent Application No. PCT/US13/47124.
International Search Report dated Jan. 26, 2015 in connection with International Application No. PCT/US2014/060150; 2 pages.
Written Opinion of International Searching Authority dated Jan. 26, 2015 in connection with International Application No. PCT/US2014/060150; 4 pages.
International Search Report dated Dec. 15, 2014 in connection with International Application No. PCT/US14/57595; 2 pages.
Written Opinion of International Searching Authority dated Dec. 15, 2014 in connection with International Application No. PCT/US14/57595; 3 pages.
International Search Report dated Dec. 16, 2014 in connection with International Application No. PCT/US14/55226; 2 pages.
Written Opinion of International Searching Authority dated Dec. 16, 2014 in connection with International Application No. PCT/US14/55226; 4 pages.
International Search Report dated Dec. 16, 2014 in connection with International Application No. PCT/US14/55229; 2 pages.
Written Opinion of International Searching Authority dated Dec. 16, 2014 in connection with International Application No. PCT/US14/55229; 4 pages.
International Search Report dated Jan. 9, 2015 in connection with International Application No. PCT/US14/57597; 2 pages.
Written Opinion of International Searching Authority dated Jan. 9, 2015 in connection with International Application No. PCT/US14/57597; 4 pages.
Non-Final Office Action dated Dec. 18, 2014 in connection with U.S. Appl. No. 14/484,047; 8 pages.
Non-Final Office Action dated Dec. 19, 2014 in connection with U.S. Appl. No. 14/484,065; 8 pages.
Non-Final Office Action dated Dec. 26, 2014 in connection with U.S. Appl. No. 14/484,225; 8 pages.
Non-Final Office Action dated Jan. 6, 2015 in connection with U.S. Appl. No. 14/512,204; 18 pages.
Non-Final Office Action dated Jan. 9, 2015 in connection with U.S. Appl. No. 14/292,423; 14 pages.
International Search Report and Written Opinion dated Jan. 10, 2014 in connection with PCT/US2013/47124; 7 pages.
International Search Report and Written Opinion dated Jun. 3, 2015 in connection with PCT/US2015/018140; 9 pages.
International Search Report and Written Opinion dated Jul. 30, 2014 in connection with PCT/US2014/019979; 14 pages.
Non-Final Office Action dated Oct. 3, 2011 in connection with U.S. Appl. No. 12/363,713; 9 pages.
Non-Final Office Action dated May 4, 2012 in connection with U.S. Appl. No. 12/434,569; 7 pages.
Final Office Action dated Jun. 13, 2012 in connection with U.S. Appl. No, 12/363,713; 13 pages.
Final Office Action dated Oct. 25, 2012 in connection with U.S. App. No. 12/434,569; 10 pages.
Non-Final Office Action dated Mar. 15, 2013 in connection with U.S. Appl. No. 12/434,569; 9 pages.
Final Office Action dated Jul. 18, 2013 in connection with U.S. Appl. No. 12/434,569; 9 pages.
Non-Final Office Action dated Nov. 9, 2013 in connetion with U.S. Appl. No. 12/434,569; 12 pages.
Non-Final Office Action dated Feb. 21, 2014 in connection with U.S. Appl. No. 14/079,385; 11 pages.
Final Office Action dated Mar. 20, 2014 in connection with U.S. Appl. No. 12/434,569; 11 pages.
Non-Final Office Action dated Feb. 24, 2015 in connection with U.S. Appl. No. 14/497,686; 13 pages.
Non-Final Office Action dated Mar. 3, 2015 in connection with U.S. Appl. No. 14/079,385; 13 pages.
Non-Final Office Action dated Mar. 27, 2015 in connection with U.S. Appl. No. 14/498,800; 19 pages.
Final Office Action dated May 18, 2015 in connection with U.S. Appl. No. 14/484,047; 10 pages.
Final Office Action dated May 21, 2015 in connection with U.S. Appl. No. 14/484,225; 13 pages.
Final Office Action dated Jul. 1, 2015 in connection with U.S. Appl. No. 14/079,385; 13 pages.

(56) References Cited

OTHER PUBLICATIONS

Non-Final Office Action dated Jul. 16, 2015 in connection with U.S. Appl. No. 12/787,505; 15 pages.
Final Office Action dated Jul. 17, 2015 in connection with U.S. Appl. No. 14/484,065; 13 pages.
Final Office Action dated Jul. 30, 2015 in connection with U.S. Appl. No. 14/512,204; 22 pages.
Final Office Action dated Sep. 3, 2015 in connection with U.S. Appl. No. 14/633,986; 17 pages.
Final Office Action dated Sep. 25, 2015 in connection with U.S. Appl. No. 14/498,800; 20 pages.
Non-Final Office Action dated Oct. 7, 2015 in connection with U.S. Appl. No. 14/461,570; 9 pages.
Non-Final Office Action dated Oct. 15, 2015 in connection with U.S. Appl. No. 14/800,581; 6 pages.
First Office Action dated Jul. 21, 2015 in connection with Chinese Patent Application No. 201080040436.3; 32 pages.
Extended European Search Report dated Sep. 28, 2015 in connection with European Patent Application No. 12828677.0; 7 pages.
Notification on Results of Estimation of Patentability of Invention dated Feb. 16, 2015 in connection with Russian Application No. 2012105917/08(009063); 7 pages.
Reid, et al.; "An Analysis of Anonymity in the Bitcoin System"; Springer New York; arXiv:1107.4524v2; physics.soc-ph; May 2012; 29 pages.
First Office Action for Chinese Application No. 201080040436.3, dated Feb. 29, 2016, 8 pages.
Supplementary European Search Report for European Application No. 10803672.4, dated Apr. 2, 2013, 4 pages.
Decision to Refuse and Minutes of the Oral Proceeding for European Patent Application No. 10803672.4, dated Feb. 23, 2016.
Decision on Grant for Russian Application No. 2012105917, dated Jan. 11, 2016, 6 pages.
Office Action for U.S. Appl. No. 12/787,505, dated Apr. 5, 2012, 16 pages.
Office Action for U.S. Appl. No. 12/787,505, dated Mar. 1, 2013, 10 pages.
Office Action for U.S. Appl. No. 12/787,505, dated Mar. 18, 2014, 10 pages.
Office Action for U.S. Appl. No. 12/787,505, dated Nov. 23, 2015, 14 pages.
Office Action for U.S. Appl. No. 12/787,505, dated Sep. 23, 2013, 10 pages.
Office Action for U.S. Appl. No. 12/787,505, dated Oct. 24, 2012, 9 pages.
Office Action for U.S. Appl. No. 12/787,505, dated Apr. 13, 2016, 14 pages.
Office Action for U.S. Appl. No. 13/605,892, dated Jan. 18, 2013, 10 pages.
Office Action for U.S. Appl. No. 13/762,184, dated Mar. 28, 2013, 8 pages.
Office Action for U.S. Appl. No. 14/808,768, dated Nov. 6, 2015, 8 pages.
Office Action for U.S. Appl. No. 14/808,789, dated Nov. 5, 2015, 6 pages.
Office Action for U.S. Appl. No. 14/808,794, dated Nov. 4, 2015, 6 pages.
Office Action for U.S. Appl. No. 14/808,831, dated Nov. 9, 2015, 6 pages.
Office Action for U.S. Appl. No. 14/808,845, dated Nov. 23, 2015, 6 pages.
Office Action for U.S. Appl. No. 13/753,384, dated Oct. 25, 2013, 14 pages.
Office Action for U.S. Appl. No. 13/753,384, dated Dec. 20, 2013, 10 pages.
Office Action for U.S. Appl. No. 13/753,384, dated May 17, 2013, 9 pages.
Office Action for Australian Application No. 2012302021, dated Oct. 22, 2015, 3 pages.

Notice of Allowance for U.S. Appl. No. 13/598,443, dated May 8, 2014, 8 pages.
Office Action for U.S. Appl. No. 13/923,089, dated Dec. 2, 2014, 5 pages.
Rick, C., "A comprehensive list of online video ad types and formats, pros and cons," ReelSEO [online], Jun. 17, 2012, [retrieved from the internet on Feb. 24, 2016], 13 pages.
Chave, P., "DPI platforms create ad insertion growth and revenue for broadcasters," TVTechnology [online], May 1, 2007, [retrieved from the internet on Feb. 24, 2016], 11 pages.
Balog, J., How to extract frames of a video, [online], Jun. 8, 2011, [retrieved from the internet on Nov. 17, 2015], 6 pages.
"Yellow vertical line in YouTube video timeline," Web Applications Stack Exchange [online], [retrieved from the internet on Nov. 17, 2015], 2 pages.
*Cinsay, Inc.* v. *Joyus, Inc. and Brightcove, Inc.*, Case No. 3:13-cv-3628-K, "Defendants Joyus, Inc.'s and Brightcove, Inc.'s Opening Claim Construction Brief," filed in the United States District Court, Northern District of Texas, Dallas Division, on Jun. 19, 2014, 33 pages.
*Cinsay, Inc.* v. *Joyus, Inc. and Brightcove, Inc.*, Case No. 3:13-cv-3628-K, "Index of Appendix in Support of Defendants Joyus, Inc.'s and Brightcove, Inc.'s Opening Claim Construction Brief," filed in the United States District Court, Northern District of Texas, Dallas Division, on Jun. 19, 2014, 52 pages.
*Cinsay, Inc.* v. *Joyus, Inc. and Brightcove, Inc.*, Case No. 3:13-cv-3628-K, "Plaintiff Cinsay, Inc.'s Markman Brief in Support of Proposed Claim Constructions," filed in the United States District Court, Northern District of Texas, Dallas Division, on Jun. 19, 2014, 34 pages.
*Cinsay, Inc.* v. *Joyus, Inc. and Brightcove, Inc.*, Case No. 3:13-cv-3628-K, "Appendix in Support of Plaintiff's Markman Brief in Support of Proposed Claim Constructions," filed in the United States District Court, Northern District of Texas, Dallas Division, on Jun. 19, 2014, 3 pages.
*Cinsay, Inc.* v. *Joyus, Inc. and Brightcove, Inc.*, Case No. 3:13-cv-3628-K, "Exhibit 1, Declaration of Jennifer Beth Ingram, and Exhibits A-D to Plaintiff's Markman Brief in Support of Proposed Claim Constructions," filed in the United States District Court, Northern District of Texas, Dallas Division, on Jun. 19, 2014, 57 pages.
*Cinsay, Inc.* v. *Joyus, Inc. and Brightcove, Inc.*, Case No. 3:13-cv-3628-K, "Exhibits E-J to Plaintiff's Markman Brief in Support of Proposed Claim Constructions," filed in the United States District Court, Northern District of Texas, Dallas Division, on Jun. 19, 2014, 22 pages.
*Cinsay, Inc.* v. *Joyus, Inc. and Brightcove, Inc.*, Case No. 3:13-cv-3628-K, "Order Dismissing All Claims and Counterclaims," United States District Court, Northern District of Texas, Dallas Division, dated Aug. 14, 2014, 1 page.
*Cinsay, Inc.* v. *Joyus, Inc.*, Case No. 3:13-cv-3628-K, "Amended Joint Claim Construction and Prehearing Statement," filed in the United States District Court, Northern District of Texas, Dallas Division, on Oct. 1, 2014, 6 pages.
*Cinsay, Inc.* v. *Joyus, Inc.*, Case No. 3:13-cv-3628-K, "Exhibit A to Amended Joint Claim Construction and Prehearing Statement," filed in the United States District Court, Northern District of Texas, Dallas Division, on Oct. 1, 2014, 2 pages.
*Cinsay, Inc.* v. *Joyus, Inc.*, Case No. 3:13-cv-3628-K, Exhibit B to Amended Joint Claim Construction and Prehearing Statement, filed in the United States District Court, Northern District of Texas, Dallas Division, on Oct. 1, 2014, 8 pages.
*Cinsay, Inc.* v. *Joyus, Inc.*, Case No. 3:13-cv-3628-K, "Defendant Joyus, Inc.'s Motion for Judgment on the Pleadings," filed in the United States District Court, Northern District of Texas, Dallas Division, on Jan. 26, 2015, 24 pages.
*Cinsay, Inc.* v. *Joyus, Inc.*, Case No. 3:13-cv-3628-K, "Plaintiff Cinsay, Inc.'s Response to Defendant Joyus, Inc.'s Motion for Judgment on the Pleadings," filed in the United States District Court, Northern District of Texas, Dallas Division, on Feb. 24, 2015, 23 pages.
*Cinsay, Inc.* v. *Joyus, Inc.*, Case No. 3:13-cv-3628-K, "Appendix in Support of Plaintiff's Response to Defendant's Motion for Judg-

(56) References Cited

OTHER PUBLICATIONS ment on the Pleadings," filed in the United States District Court, Northern District of Texas, Dallas Division, on Feb. 24, 2015, 2 pages.
*Cinsay, Inc.* v. *Joyus, Inc.*, Case No. 3:13-cv-3628-K, "Exhibit A to Plaintiff's Response to Defendant's Motion for Judgment on the Pleadings," filed in the United States District Court, Northern District of Texas, Dallas Division, on Feb. 24, 2015, 14 pages.
*Cinsay, Inc.* v. *Joyus, Inc.*, Case No. 3:13-cv-3628-K, "Exhibit B to Plaintiff's Response to Defendant's Motion for Judgment on the Pleadings," filed in the United States District Court, Northern District of Texas, Dallas Division, on Feb. 24, 2015, 12 pages.
*Cinsay, Inc.* v. *Joyus, Inc.*, Case No. 3:13-cv-3628-K, "Exhibit C to Plaintiff's Response to Defendant's Motion for Judgment on the Pleadings," filed in the United States District Court, Northern District of Texas, Dallas Division, on Feb. 24, 2015, 13 pages.
*Cinsay, Inc.* v. *Joyus, Inc.*, Case No. 3:13-cv-3628-K, "Markman Memorandum Opinion and Order," United States District Court, Northern District of Texas, Dallas Division, dated Mar. 4, 2015, 38 pages.
*Cinsay, Inc.* v. *Joyus, Inc.*, Case No. 3:13-cv-3628-K, "Order of Dismissal Without Prejudice," dated Apr. 7, 2015, and "Order Denying Defendant's Motion for Judgment on the Pleadings," dated Mar. 25, 2015, United States District Court, Northern District of Texas, Dallas Division, 2 pages.
Office Action for U.S. Appl. No. 12/787,505, dated Feb. 10, 2017, 17 pages.
Supplementary European Search Report for European Application No. 16168191.1, dated Sep. 6, 2016, 9 pages.
Office Action for U.S. Appl. No. 14/292,423, dated Jul. 12, 2016, 14 pages.
Office Action for U.S. Appl. No. 15/063,418, dated May 25, 2016, 17 pages.
Office Action for U.S. Appl. No. 15/063,399, dated May 27, 2016, 13 pages.
Office Action for U.S. Appl. No. 15/063,412, dated May 19, 2016, 17 pages.
Office Action for U.S. Appl. No. 15/063,415, dated May 19, 2016, 14 pages.
Vaughan-Nichols, S. J., "Will HTML 5 restandardize the web?", Computer, 43(4):13-15 (Apr. 2010).
Grigoras, E., "Viral marketing—active consumers vs. passive consumers," (Jan. 2009), Retrieved from the Internet: <URL: http://papers.ssrn.com/sol3/Delivery_cfm/SSRN_ID1479789_code1346484.pdf?abstractid=1479789&mirid=1 [Retrieved on Aug. 25, 2016].
Office Action for U.S. Appl. No. 14/292,423, dated Aug. 31, 2017, 18 pages.
Office Action for U.S. Appl. No. 15/063,405, dated May 13, 2016, 15 pages.
Office Action for U.S. Appl. No. 15/063,407, dated May 18, 2016, 20 pages.
Office Action dated Aug. 27, 2014 in connection with U.S. Appl. No. 12/787,505.
Office Action dated Aug. 20, 2014 in connection with U.S. Appl. No. 13/923,089.
Office Action dated Oct. 2, 2014 in connection with U.S. Appl. No. 12/434,569.
Notification of Transmital of the International Search Report and the Written Opinion of the International Searching Authority, or the Declaration dated Nov. 24, 2014 in connection with International Patent Application No. PCT/US2014/55233.

\* cited by examiner

FIG. 3

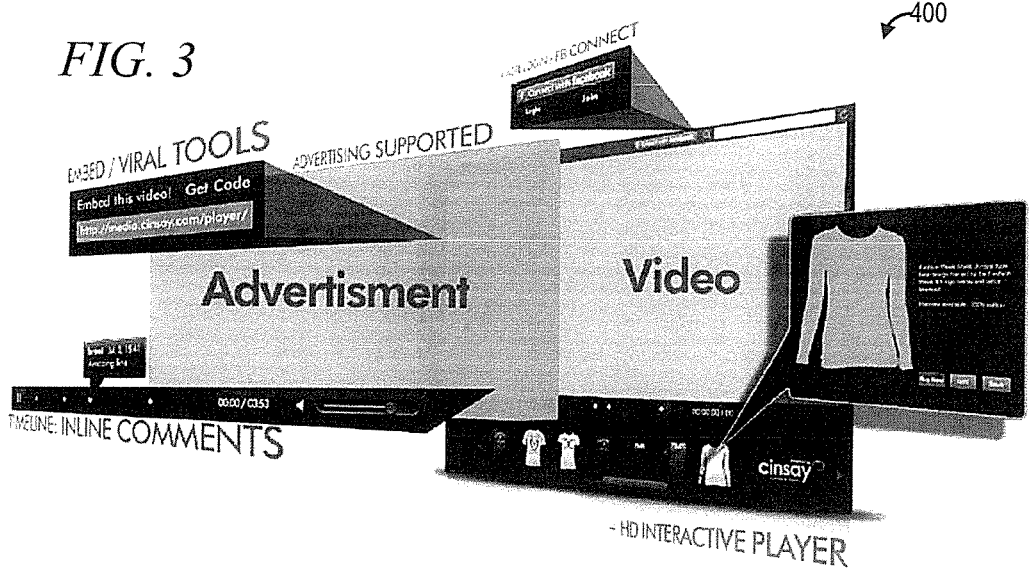

Application Embed Code Example
(utilizing standard embed code integration into remote online destinations)

```
<object classid='clsid:D27CDB6E-AE6D-11cf-96B8-444553540000'
        id='Syndicated Player' width='315' height='448'
        codebase='http://fpdownload.macromedia.com/get/flashplayer/current/swflash.cab'>
    <param name='movie' value='http://www.cinsay.com/player/SyndicatedPlayer.swf?playerId=fs000080000iaj31pel0000000' />
    <param name='quality' value='high' />
    <param name='bgcolor' value='#000000' />
    <param name='wmode' value='transparent' />
    <param name='allowfullscreen' value='true' />
    <param name='allowScriptAccess' value='sameDomain' />
    <embed src='http://www.cinsay.com/player/SyndicatedPlayer.swf?playerId=fs000080000iaj31pel0000000' quality='high' bgcolor='#000000'
        width='100%' height='100%' name='Syndicated Player' align='middle'
        play='true'
        loop='false'
        quality='high'
        wmode='transparent'
        allowScriptAccess='sameDomain'
        allowFullScreen='true'
        type='application/x-shockwave-flash'
        pluginspage='http://www.adobe.com/go/getflashplayer'>
    </embed>
</object>
</noscript>
```

INTERACTIVE PRODUCT PLACEMENT SYSTEM AND METHOD THEREFOR

CROSS-REFERENCE TO RELATED APPLICATIONS

This application is a continuation of U.S. patent application Ser. No. 12/787,505, filed May 26, 2010, entitled VIRAL SYNDICATED INTERACTIVE PRODUCT SYSTEM AND METHOD THEREFOR, which is a continuation-in-part of U.S. patent application Ser. No. 12/363,713, filed Jan. 30, 2009 (now U.S. Pat. No. 8,312,486), entitled INTERACTIVE PRODUCT PLACEMENT SYSTEM AND METHOD THEREFOR, which claims the benefit of U.S. Provisional Patent Application No. 61/024,829, filed Jan. 30, 2008. This application hereby claims the benefit and/or priority each of said respective applications (Ser. Nos. 12/787,505; 12/363,713; and 61/024,829) and hereby incorporates them by reference as if fully set forth herein.

TECHNICAL FIELD

The invention relates generally to interactive media content distribution, and, more particularly, to the placement in a viral player of products associated with media content for interactive purchase.

BACKGROUND

Using conventional technology, e-commerce purchases are typically facilitated on the Internet by directing consumers to purchase products through specified websites. Specifically, a consumer on the Internet may be directed to a specific website via online advertising or sponsored links, where such websites describe specific products available for purchase, allow the consumer to choose a product for purchase, and direct the consumer to purchase the product through an e-commerce application from that website. Thus, one drawback with conventional technology is that it requires the consumer to navigate to a specific website to purchase a product, which can be time-consuming and discourage product purchases.

Furthermore, using conventional technology, products advertised on the Internet are traditionally advertised through banner advertising, "clickable" ads, sponsored links, or the like. Such advertising can range from static graphical images to rich media content, permitting the user to "click" on the ad and be redirected to a new web page (either in a new browser window or a new tab in the user's browser) to display the product, describe the product, and provide a mechanism to facilitate the purchase through an e-commerce application through that website. If a user is watching and/or listening to media content when the purchase is desired, then it can be very distracting to have to navigate to another web page to purchase the product and, when attempting to return to the media content, the user may potentially lose the media content or lose the place in the media content requiring that the media content be re-started, frustrating a user and discouraging future purchases, and further resulting in lost revenues and business.

Still further, with conventional technology, most product marketing on the Internet is achieved through banner advertising, "click-through" ads, or similar commercials run on a media player on a specific website. Although such ads can be placed on different websites through contractual arrangements with website owners and ad server networks, such ads are limited to specific areas designated for advertising on such websites, thereby limiting the scope of advertising to users who visit such specific websites, and further limiting such scope to the specific number of ad rolls associated with the traffic to such website or imposing other ad servicing provider limitations on the number of times such advertising for the product is presented on such websites, thereby restricting a user's opportunity to purchase the advertised product.

Therefore, what is needed is a system and method for facilitating e-commerce transactions without requiring that a consumer navigate to another website to engage in a transaction for the purchase of a product, without excessively distracting a consumer when watching and/or listening to media content, without limiting the marketing of a product through ads in specific areas designated for advertising on specific websites, without limiting the scope of advertising to users who visit such specific websites, and without limiting the marketing of a product to a specific number of ad rolls or other ad servicing provider limitations on the number of times advertising for products is presented on such websites.

SUMMARY

The present invention, accordingly, permits a consumer to view a product in conjunction with a viral player, and to select the product for purchase within the player, rather than be redirected to a separate website. There is thus no longer a need to go to a specific website to purchase a product; the viral player acts as the vehicle to facilitate the "front-end" of the purchase.

Furthermore, products can be displayed in connection with specified content at the player level—the present invention brings the e-commerce "store" directly to the user, rather than directing the user to a specified website. Specifically, the player can run media content within the player frame, with associated products listed in a separate area of the player that the user can "click" on to facilitate the purchase through the e-commerce platform back-end. Essentially, the user is able to view and purchase a product within the player while watching or listening to media content, thereby bringing the ability to facilitate the sale of a product as part of the rich media experience.

Still further, products may be marketed "virally", permitting content owners to monetize content. In accordance with the present invention, the syndicated e-commerce player is designed to be embeddable so that users can place it in emails to friends, on social networking sites (e.g. Facebook, MySpace, Google Buzz, Yelp, etc.), or other websites, thereby permitting the syndicated e-commerce player to be distributed virally on the Internet. As a result, the products that are listed in the syndicated e-commerce player can be marketed virally without such restrictions, directly to potential consumers who will be able to view or listen to the media content of the syndicated e-commerce player and immediately purchase the associated product(s) from within the syndicated e-commerce player without being redirected from the media experience.

In one preferred embodiment, the present invention achieves the aforementioned features in a method for facilitating the purchase of commercial products in connection with the display of media content, whereby a player comprises a media production component and an interactive e-commerce component embedded therein. The player with the e-commerce component can be virally copied and propagated from one web page to any number of other web pages.

In another preferred embodiment, a player frame is generated in a first web page. At least a first portion of the player frame is reserved for said media content, and at least a second portion of the player frame is reserved for an interactive e-commerce component. Code is embedded in the player frame for retrieving the media content and placing the media content in the first portion of said player, and code is embedded in the player frame for retrieving the interactive e-commerce component and placing the interactive e-commerce component in the second portion of the player. The player frame may then be virally copied and propagated from one web page to any number of other web pages.

A system for implementing the sale of a product in connection with the display of media content includes an enterprise nucleus, and one or more syndicated e-commerce applications coupled in data communication to the enterprise nucleus. The one or more syndicated e-commerce applications include an input terminal for facilitating entry of data by a user and an output terminal for communicating data to a user. An e-commerce platform is coupled in data communication to the enterprise nucleus for facilitating the purchase of products.

The system preferably includes at least one content distribution network (CDN) and at least one advertising network, both of which are coupled in data communication to the enterprise nucleus.

The enterprise nucleus of the system further preferably includes a computer having at least a processor and a memory operably coupled to the processor, the memory being configured for storing a computer program executable by the processor, the computer program being configured for performing steps of receiving from one of said one or more e-commerce applications a request for at least one of media, products, and offers, and for transmitting said request to at least one of said CDN and said advertising network; receiving from said at least one of said CDN and said advertising network said at least one of media, products, and offers and for transmitting said at least one of media, products, and offers to said one of said one or more e-commerce applications; receiving from said one of said one or more e-commerce applications a registration ID and a purchase order, and for transmitting said registration ID and a purchase order to said e-commerce platform; and for receiving from said e-commerce platform transaction data relating to said registration ID and a purchase order, and for transmitting said transaction data to said one of said one or more e-commerce applications.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2 and 3 exemplify an interface application wireframe utilizing standard embed code for calling into remote online destinations;

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTML (including HTML5), HTTP, HTTPS, SWF, XML, PHP, Adobe Flash, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
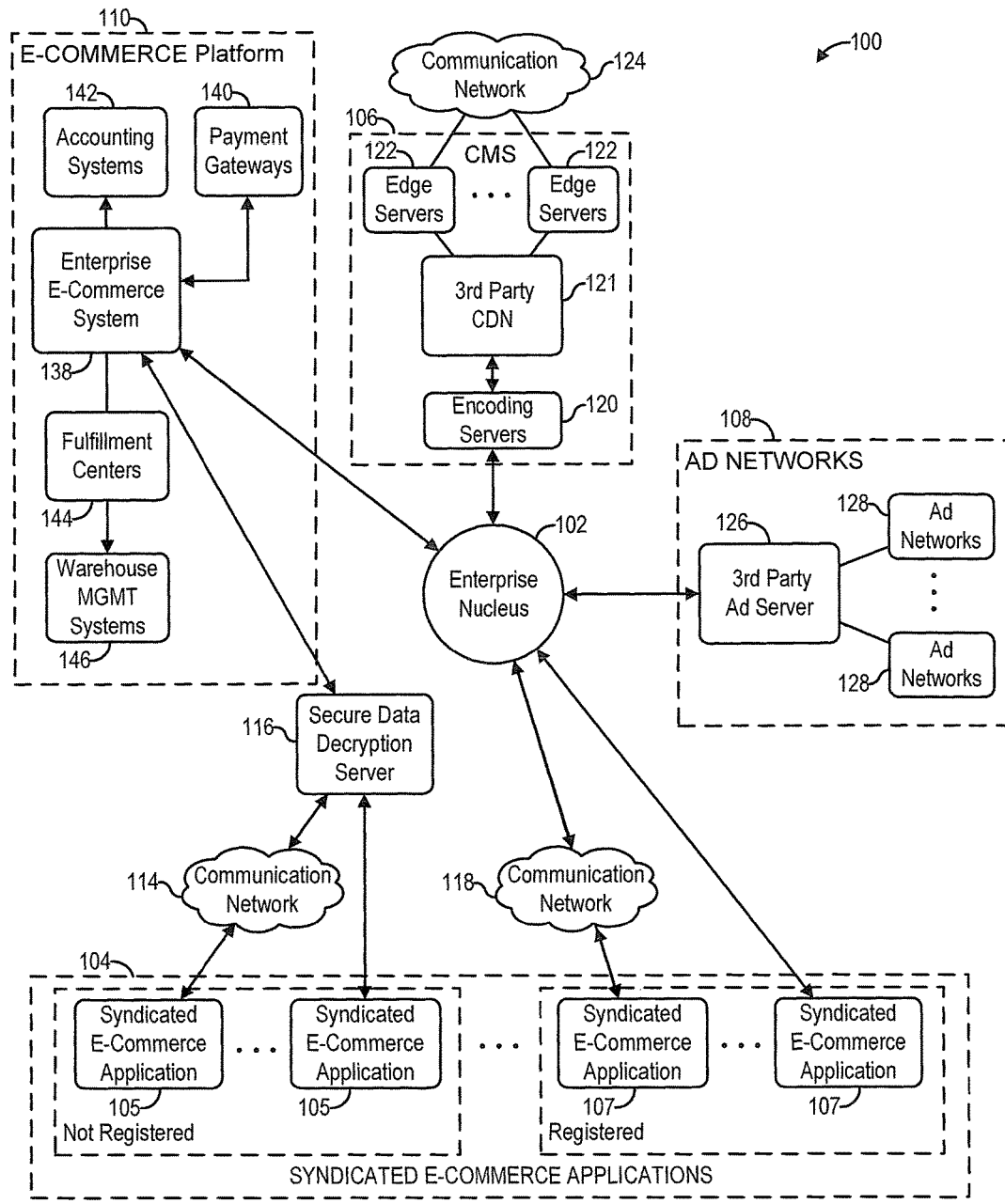
FIG. 1 is a high level block diagram exemplifying data flow in an interactive product placement system embodying features of the present invention.

Referring to FIG. 1 of the drawings, the reference numeral 100 generally designates an interactive content distribution system embodying features of the present invention. The system 100 includes an enterprise nucleus 102 configured as a hub for controlling all operations of the systems 100, discussed in further detail below. Coupled to the enterprise nucleus 102 are one or more syndicated e-commerce applications 104, a content management system ("CMS") 106, advertising networks 108, and an e-commerce platform 110.

The syndicated e-commerce applications 104 coupled to the enterprise nucleus 102 include e-commerce applications 105 in which the end-users are not registered with the e-commerce platform 110 and e-commerce applications 107 in which the end-users are registered with the e-commerce platform 110. The syndicated e-commerce applications 105 and 107 include, by way of example but not limitation, mobile device applications for mobile devices (e.g., iPhone, smartphones running the Android operating system, portable gaming platforms such as Nintendo DS), social media applications (e.g., FaceBook, MySpace, Google Buzz), syndicated media player applications, syndicated store applications, applications written for game consoles (e.g., X-box, Playstation, Nintendo, Wii), Internet protocol television ("IPTV"), and any device and/or platform that would allow insertion of syndicated e-commerce applications and conduct the syndicated e-commerce process discussed below. Each of the unregistered e-commerce applications 105 are preferably coupled, either directly (e.g., cable, satellite, fiber optic) or via a communication network (e.g., the Internet, VPN, cellular communications network) 114, to a secure data decryption server ("SDDS") 116, which SDDS is in turn coupled to the e-commerce platform 110, described in further detail below. Each of the registered e-commerce applications 107 are preferably coupled, either directly or via a communication network (e.g., the Internet, cellular communications network) 116, to the enterprise nucleus 102.

The CMS 106 includes an encoding server 120 coupled to the enterprise nucleus 102 and to a third party content distribution network ("CDN") 121. The CDN 121 is preferably coupled to one or more edge servers 122, such as provided by Akamai, which provide an interface, via a communication network (e.g., the Internet) 124, between the CDN 124 and one or more content providers (not shown). Content provided by the CMS 106 includes, by way of example but not limitation, motion pictures, motion picture trailers, video, and audio.

The advertisement ("ad") networks 108 include a third-party advertisement server 126 (e.g., Ad-Tech) coupled to the enterprise nucleus 102, and one or more ad networks 128 (e.g., AdMob, Tremor Media, and LC?). The ad networks 108 provide, by way of example but not limitation, products lists showing which products are associated or correlated with at least one item associated with or displayed in certain media, and other product information, such as pricing, availability, and the like.

The e-commerce platform 110 includes an enterprise e-commerce system 138 coupled to the enterprise nucleus 102. One or more payment gateways 140 (e.g., Paypal), accounting systems 142, and fulfillment centers 144 are coupled to the enterprise e-commerce system 138. One or more warehouse management systems 146 are connected to each fulfillment center 144. The enterprise e-commerce system 138 is further preferably coupled to the SDDS 116 for receiving registration application data from the e-commerce application 105.

Figure 2:

FIG. 2 exemplifies a player frame 200 embodying features of the invention. The frame 200 preferably includes a header 202 and footer 204, as well as a number of sub-frames 206 sandwiched between the header and footer. The sub-frames 206 may be configured for displaying account information, categories, products, featured products, featured offer, a shopping cart, total charges, and additional links (e.g., About Us, Shipping, Returns, Privacy & Security, Conditions of Use, Contact Info, Gift Voucher FAQ).

FIG. 3 exemplifies an alternate embodiment of player frame with videocontent, advertisements, and an e-commerce component overlaid on the player frame, along with viral tools.

Figure 4:
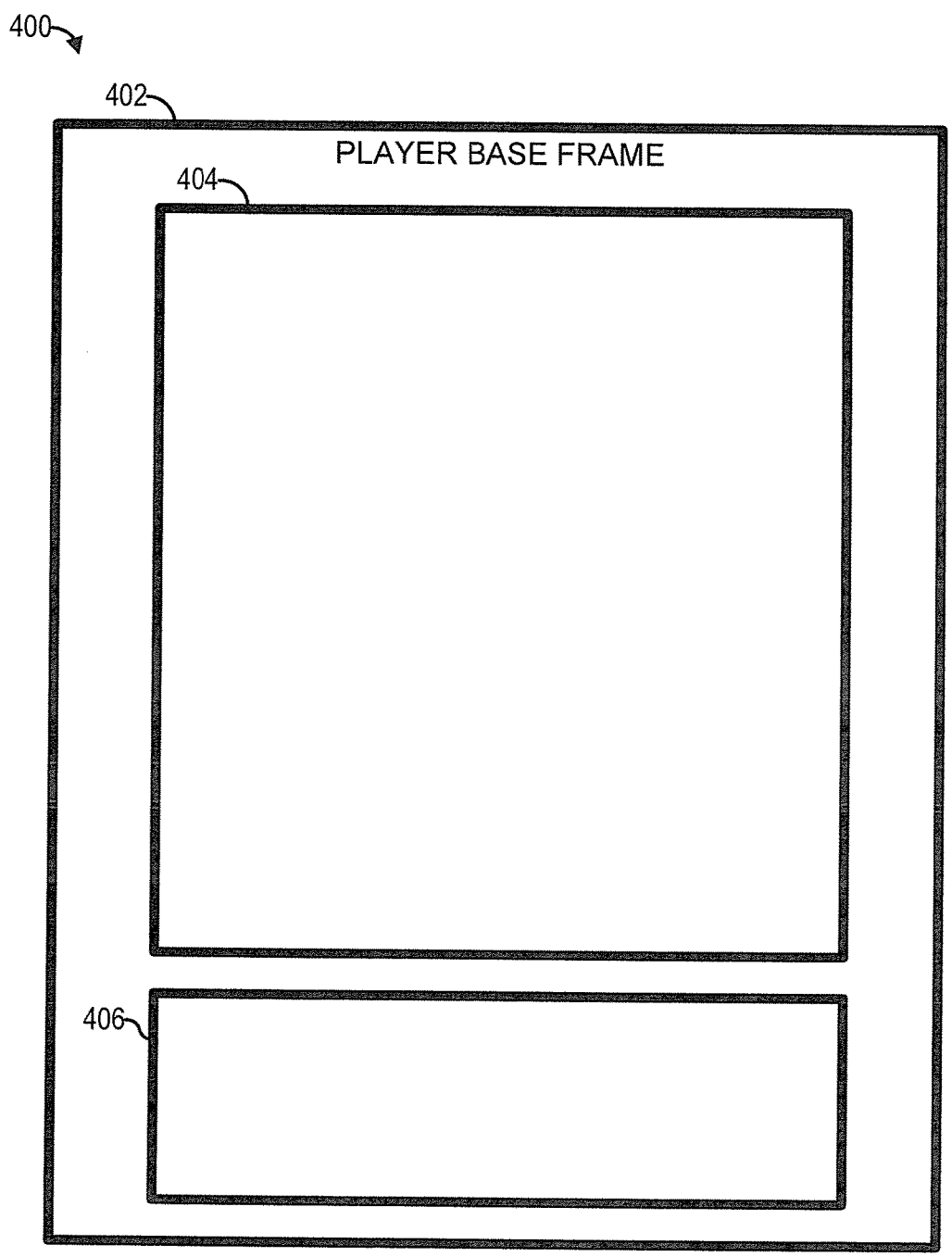
FIG. 4 exemplifies a syndicated e-commerce interface application wireframe utilizing standard embed code into remote online destinations.

FIG. 4 exemplifies a player base frame 400 having an main frame 402, subframe 404 configured for a video production (not part of the base frame), and a subframe 406 configured for an e-commerce application (not part of the base frame). The player base frame 400 also includes embed code (not shown), such as HTML code, for retrieving media content from the CMS 106, ad content and a product list from the ad networks 108, and an e-commerce component of the player from the enterprise nucleus 102, as discussed in further detail below. The player base frame 400, with the embed code for retrieving media content, ad content, and an e-commerce component, may be virally copied and propagated from one web page to any number of other web pages on the Internet.

Figure 5:
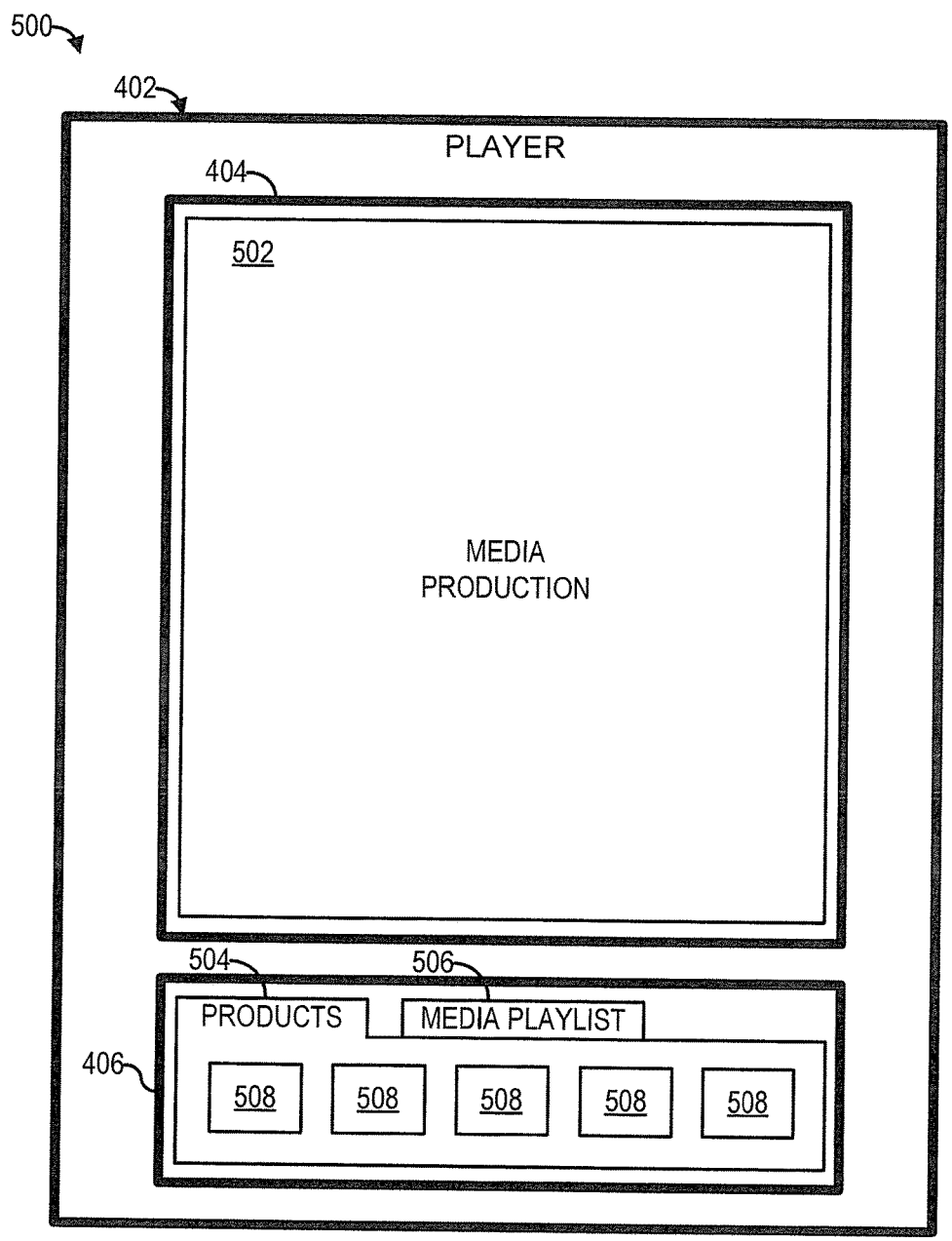
FIGS. 5 and 6 exemplify an implementation embodiment of a syndicated e-commerce interface application wireframe for implementing features of the invention.
Figure 6:
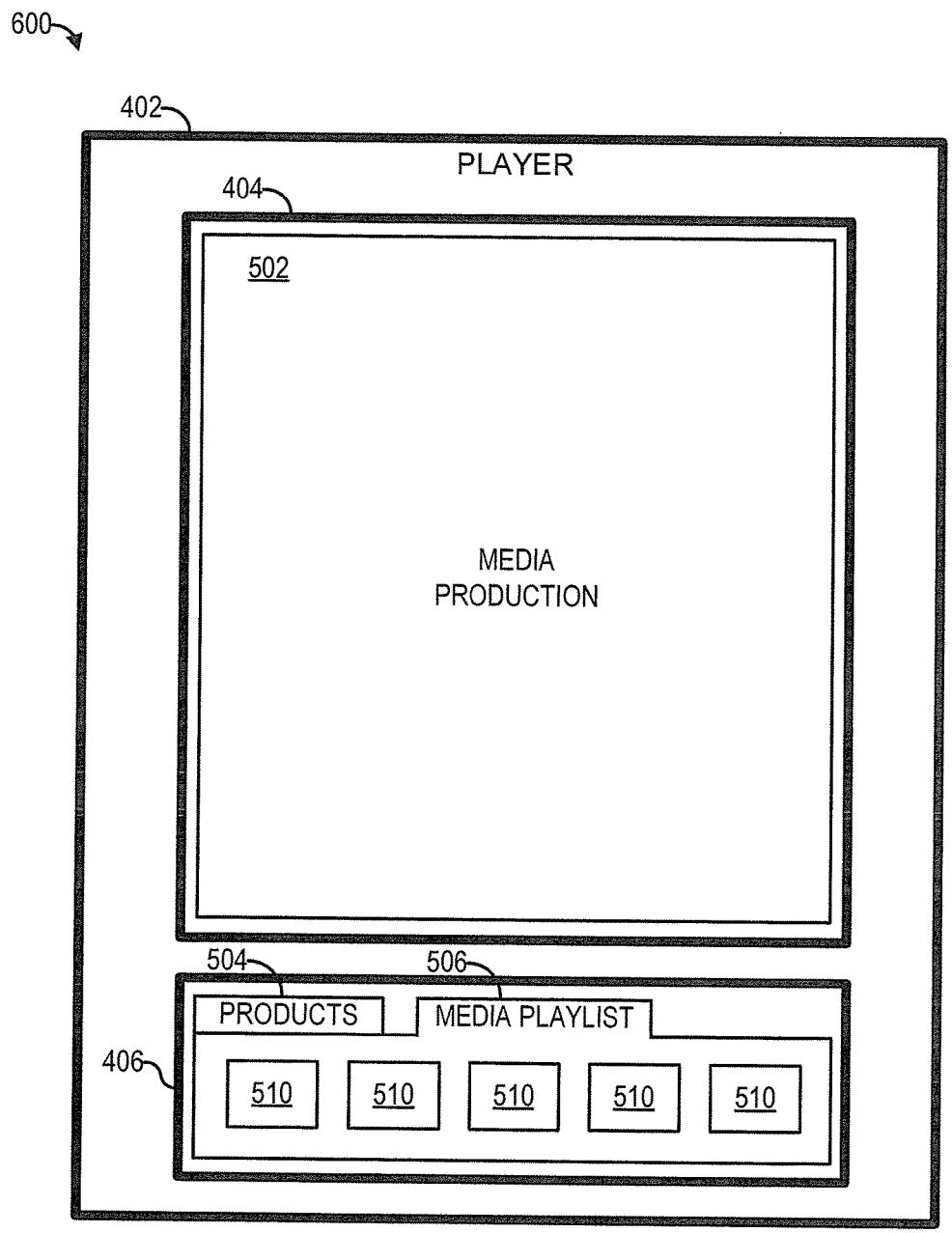

FIGS. 5 and 6 exemplify a player 500 built on the player base frame of FIG. 4, as it would be displayed, for example, on a computer monitor (not shown). The player 500 preferably includes media content (e.g., video, motion picture, audio) 502 presented within the subframe 404 (using, e.g., Flash encoding) and a syndicated e-commerce component in the subframe 504. The e-commerce component is configured to be an interface between a user and the e-commerce platform 110 and the SDDS 116 (discussed below with respect to steps 714-738 of FIG. 7), and is preferably built on custom encoding, and preferably includes a product list 504 (FIG. 5) and a media play list 506 (FIG. 6) integrated therein for use by a user. The product list 504 preferably displays products 508 that correspond to products being used in the media production 502, which products which may be selected for purchase through the interactive e-commerce component in the subframe 504. The media play list 506 preferably displays a number of media from which a user may select to view or listen to in the media production 502.

Figure 7:
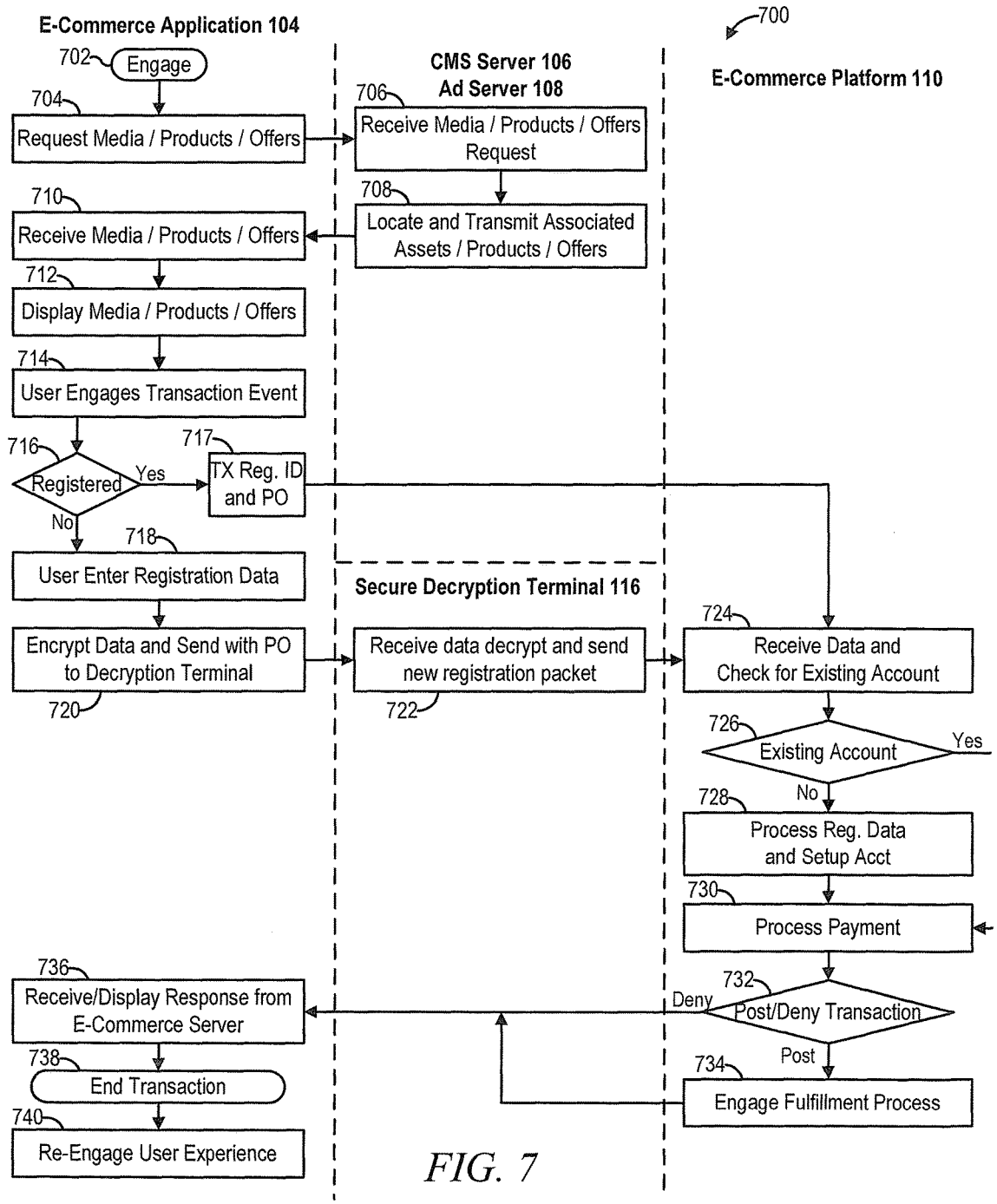
FIG. 7 is a flow chart exemplifying logic utilized in the invention.

FIG. 7 depicts a flow chart 700 exemplifying one preferred embodiment for using the invention. In step 702, a user engages an e-commerce application 104, and in step 704, a user requests (e.g., via the media play list 506) media content (e.g., video, audio, game) with which to be presented. The e-commerce application 104 then generates a request for same along with associated products and product offers, and transmits the request to the enterprise nucleus 102 which forwards same to the CMS server 106 and ad server 108. In step 706, the CMS server 106 retrieves the requested media content and the ad server 108 retrieves ad content (i.e., products and product offers) associated with the media content. In step 708, the requested media content along with associated ad content is transmitted to the e-commerce application 104, and in step 710, same is received by the e-commerce application. In step 712, the media content is presented for display to the user via the media production window 502, and associated ad content is presented in the sub-frame 406.

While viewing the media content, if a user/viewer should see an item or product that the user/viewer would find desirable to have, then in step 714, the user/viewer may engage the e-commerce component 504 to place an order for the product. In step 716, a determination is made whether the user is registered with the e-commerce platform to order the product. If it is determined at step 716 that the user is registered, then execution proceeds to step 717 in which the e-commerce application 104 generates a message comprising the user's registration data and purchase order and forwards same to the e-commerce platform 110. If it is determined at step 716 that the user is not registered, then execution proceeds to step 718 in which the user is prompted to provide information to become registered to purchase the product. In step 720, the user's registration application data is encrypted and transmitted to a secure data decryption server (SDDS), and in step 722, the encrypted data is decrypted and forwarded to the e-commerce platform 110.

At step 724, the e-commerce platform receives the registration data and checks to determine whether the user has an existing account. In step 726, if the user has an existing account, then execution proceeds to step 730; otherwise, execution proceeds to step 728. At step 728, the registration application data is processed and an account is setup in the name of the user, and execution proceeds to step 730. At step 730, payment for the product to be purchased is processed, and at step 732, a determination is made whether to post or deny the transaction. If the transaction is denied, a report of same is transmitted to the e-commerce application 104. If the transaction is posted, then in step 734 the fulfillment center 144 in conjunction with the warehouse management system 146 is instructed to fill the order and a report of same is transmitted to the e-commerce application 104.

In step 736, the e-commerce application 104 receives the report that the transaction was either denied or posted and presents same to the user, and the transaction is terminated at step 738. At step 740, the user resumes viewing or listening to the media content.

Figure 8:
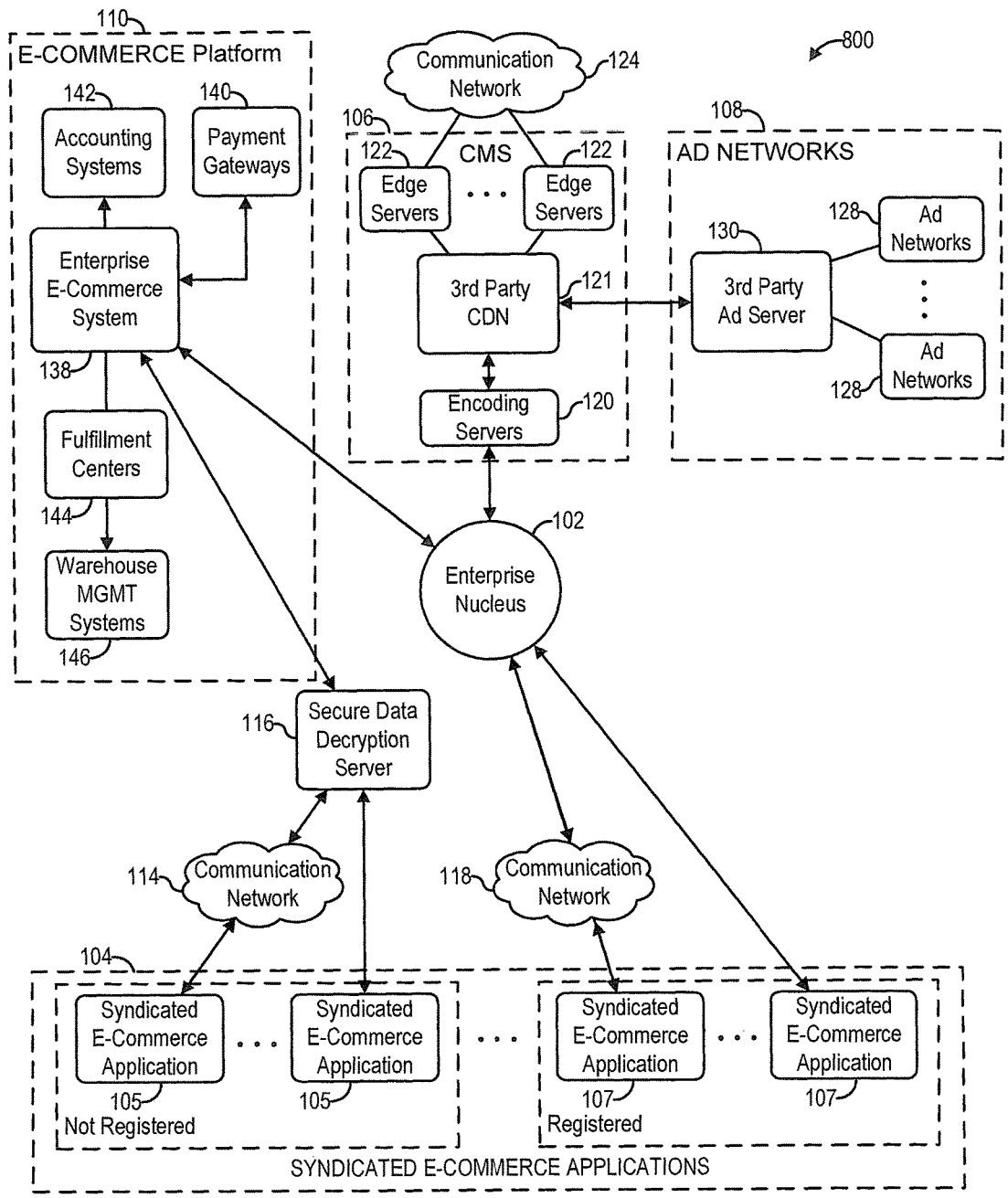
FIGS. 8-10 exemplify alternate embodiments of the system of FIG. 1.
Figure 9:
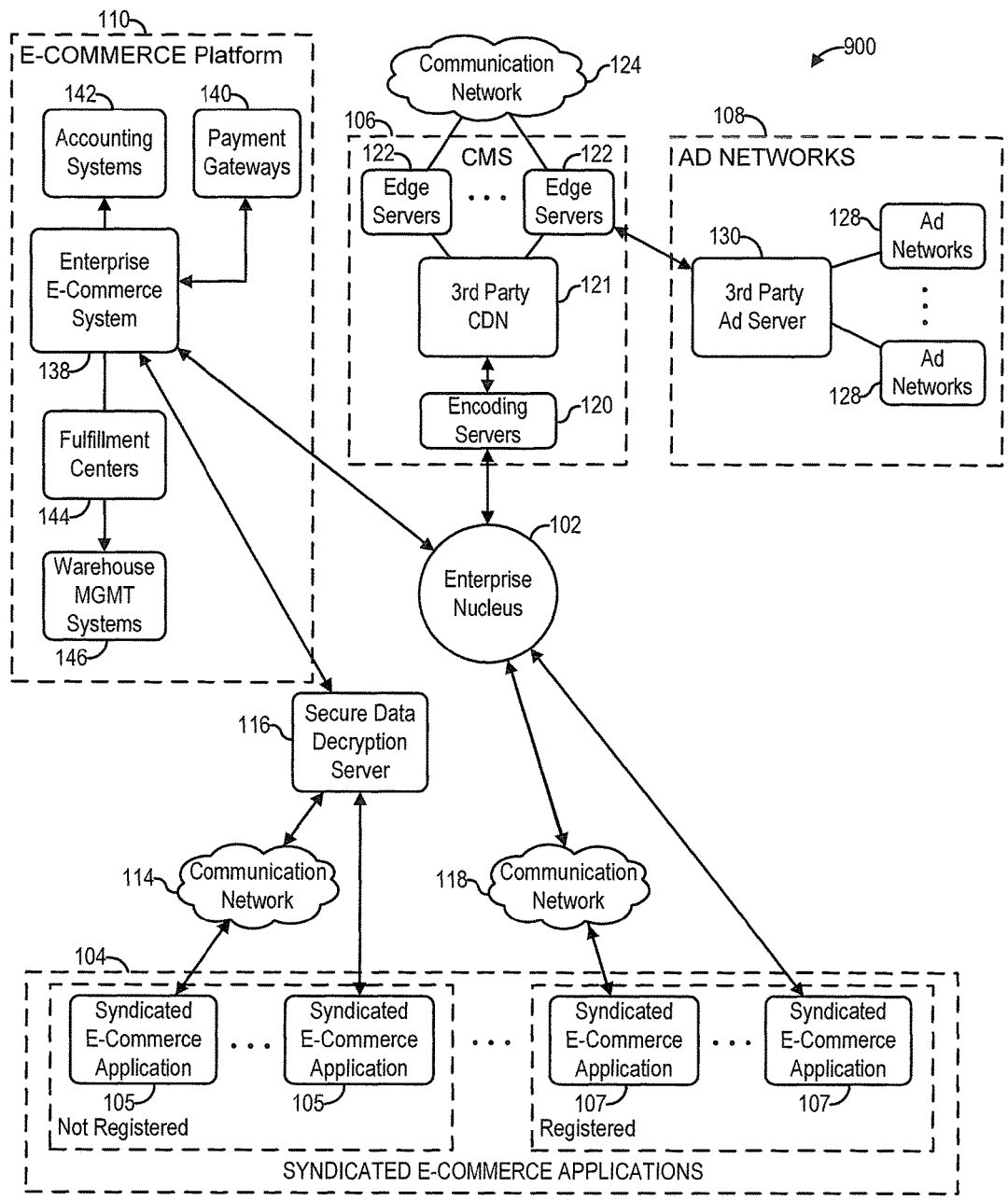
Figure 10:
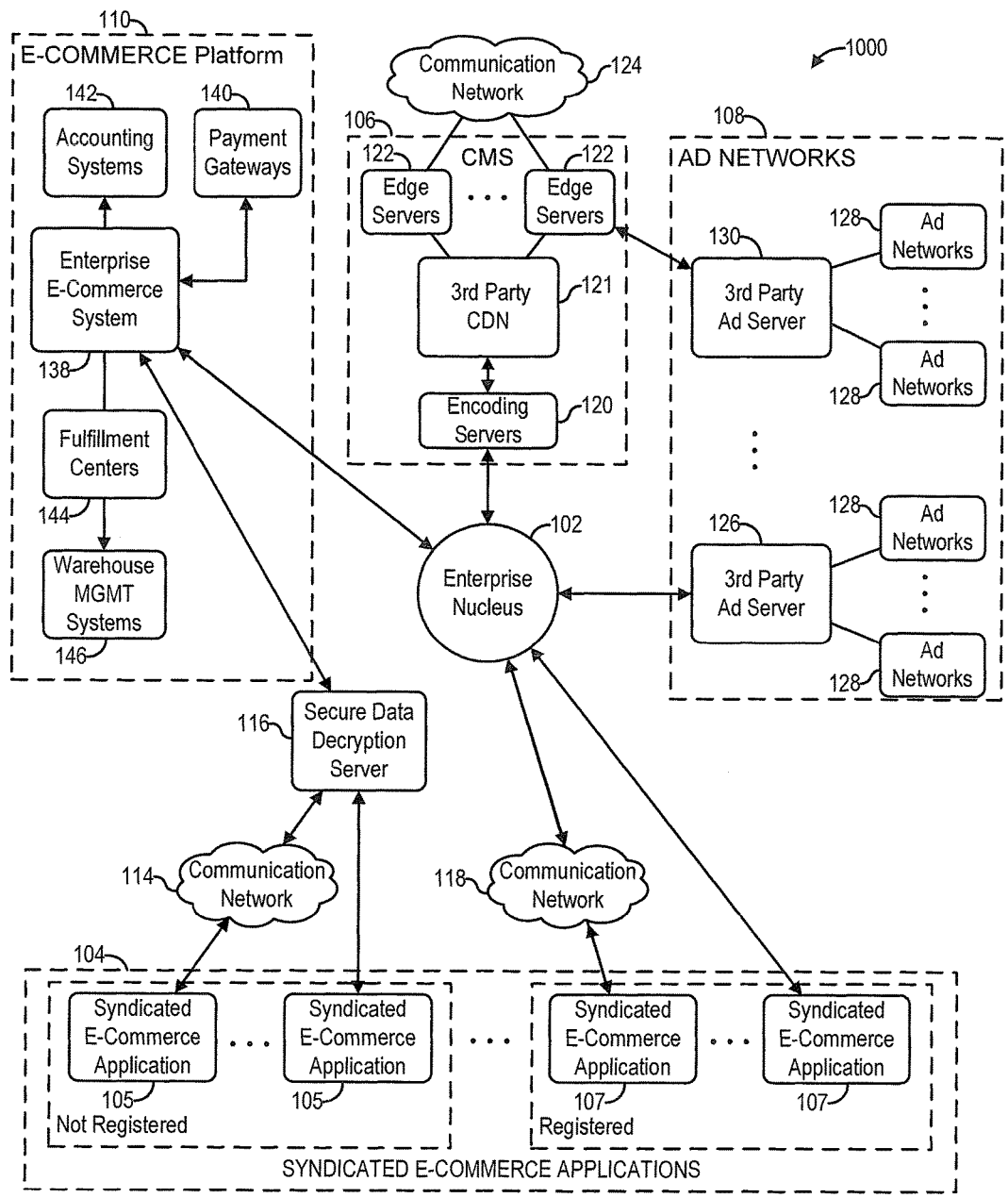

It is understood that the present invention may take many forms and embodiments. Accordingly, several variations may be made in the foregoing without departing from the spirit or the scope of the invention. For example, FIG. 8 shows a system 800 in which the third party ad server 130 may be coupled directly to the third party CDN; FIG. 9 shows a system 900 in which the third party ad server 130 may be coupled directly to the CMS edge servers 122; and FIG. 10 shows a system 1000 in which the third party ad server 130 may be coupled in any combination of ways depicted by FIGS. 1, 8, and 9, and in particular, directly to the enterprise nucleus 102 and CMS edge servers 122.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method comprising:
   transmitting or receiving one or more embed codes to or from a first device, the one or more embed codes configured when instantiated or executed by the first device to render an environment including a player base frame within a web page, the player base frame having a media content subframe and an e-commerce subframe, the one or more embed codes configured to automatically render the environment by:
   retrieving media content that contains one or more products or services for display in the media content subframe of the player base frame;
   retrieving an interactive e-commerce component at the first device separate from the retrieval of the media content, the interactive e-commerce component for presentation in the e-commerce subframe of the player base frame;
   responsive to a user request, using the interactive e-commerce component in the e-commerce subframe, determining whether a user associated with the user request is registered;
   responsive to the user being registered, initiating and completing via the interactive e-commerce component in the e-commerce subframe of the player base frame a transaction associated with the one or more products or services, while the user watches or listens to the media content, without being redirected from the player base frame;
   displaying, in response to user input, further information about the one or more products or services not previously displayed to the user in the player base frame; and
   retrieving a viral sharing component configured to allow the user to initiate, within the player base frame, replication of the one or more embed codes to a second device;
   wherein the one or more embed codes are configured when replicated to the second device and instantiated or executed by the second device to automatically render another environment with another player base frame having a media content subframe and an e-commerce subframe within another web page by repeating the retrieving of the media content, the retrieving of the interactive e-commence component, and the retrieving of the viral sharing component to replicate the one or more embed codes to a third device.

2. The method of claim 1, wherein the player base frame is configured to control the interactive e-commence component display content as an overlay over the media content.

3. A method comprising:
   transmitting or receiving one or more embed codes to or from a first device, the one or more embed codes configured when instantiated or executed by the first device to render an environment including a player base frame within a web page, the player base frame having a media content subframe, the one or more embed codes configured to automatically render the environment by:
   retrieving media content that contains one or more products or services for display in the media content subframe of the player base frame;
   retrieving an interactive e-commerce component at the first device separate from the retrieval of the media content;
   responsive to a user request, using the interactive e-commerce component, determining whether a user associated with the user request is registered;
   responsive to the user being registered, initiating and completing within the player base frame a transaction associated with the one or more products or services, while the user watches or listens to the media content, without being redirected from the player base frame;
   displaying further information not previously displayed in the player base frame about the one or more products or services; and
   responsive to another user request, replicating the one or more embed codes to a second device through a social networking site or a website;
   wherein the one or more embed codes are configured when replicated to the second device and instantiated or executed by the second device to automatically render another environment with another player base frame having a media content subframe within another web page by repeating the retrieving of the media content, the retrieving of the interactive e-commerce component, and the replicating of the one or more embed codes.

4. The method of claim 3, further comprising:
   displaying within the player base frame, by the interactive e-commerce component, one or more graphics associated with the one or more products or services;
   wherein at least one of initiating the transaction or retrieving the further information is done in response to detecting the user interacting with an area of the player base frame where the one or more graphics are displayed.

5. The method of claim 4, wherein at least some of the one or more graphics do not overlay an area where the media content is displayed in the player base frame.

6. The method of claim 3, wherein at least some of the display for the further information or at least some of a display for the transaction at least partially overlays an area where the media content is displayed in the player base frame.

7. The method of claim 3, further comprising:
   allowing, by the interactive e-commerce component, the user to complete within the player base frame the transaction associated with the one or more products or services while the user watches or listens to the media content.

8. The method of claim 3, wherein the interactive e-commerce component includes a selectable graphical listing of the one or more products or services.

9. The method of claim 3, further comprising:
retrieving and displaying within the player base frame, by the one or more embed codes, a selectable list of media content, and upon the user selecting media content from the list, retrieving the interactive e-commerce component associated with the selected media content.

10. The method of claim 3, further comprising:
displaying within the player base frame, by the interactive e-commerce component, a shopping cart with the one or more products or services.

11. The method of claim 3, further comprising:
transmitting or receiving at least one of the media content or the interactive e-commerce component.

12. The method of claim 3, further comprising:
transmitting or receiving the media content and the interactive e-commerce component.

13. A system comprising:
one or more computers configured to transmit or receive one or more embed codes, the one or more embed codes configured when instantiated or executed by a first device to render an environment including a player base frame within a web page, the player base frame having a media content subframe, the one or more embed codes configured to automatically render the environment by:
retrieving media content that contains one or more products or services for display in the media content subframe of the player base frame;
retrieving an interactive e-commence component at the first device separate from the retrieval of the media content;
responsive to a user request, using the interactive e-commerce component, determining whether a user associated with the user request is registered;
responsive to the user being registered, initiating and completing within the player base frame a transaction associated with the one or more products or services, while the user watches or listens to the media content, without being redirected from the player base frame;
displaying further information not previously displayed in the player base frame about the one or more products or services;
responsive to another upset request, replicating the one or more embed codes to a second device through a social networking site or a website;
wherein the one or more embed codes are configured when replicated to the second device and instantiated or executed by the second device to automatically render another environment with another player base frame within another web page by repeating the retrieving of the media content and the retrieving of the interactive e-commence component.

14. The system of claim 13, wherein:
the player base frame is configured to control the interactive e-commerce component to display, within the player base frame, one or more graphics associated with the one or more products or services; and
the one or more computers are configured to at least one of initiate the transaction or retrieve the further information in response to the user interacting with an area of the player base frame where the one or more graphics are displayed.

15. The system of claim 14, wherein at least some of the one or more graphics do not overlay an area where the media content is displayed in the player base frame.

16. The system of claim 13, wherein at least some of the display of the further information or at least some of a display for the transaction at least partially overlays an area where the media content is displayed in the player base frame.

17. The system of claim 13, wherein the player base frame is configured to control the interactive e-commerce component to allow the user to complete, within the player base frame, the transaction associated with the one or more products or services while the user watches or listens to the media content.

18. The system of claim 13, wherein the interactive e-commerce component includes a selectable graphical listing of the one or more products or services.

19. The system of claim 13, wherein the one or more embed codes are further configured when instantiated or executed by the first device to:
retrieve and display, within the player base frame, a selectable list of media content, and
upon the user selecting media content from the list, retrieve the interactive e-commerce component associated with the selected media content.

20. The system of claim 13, wherein the player base frame is configured to control the interactive e-commerce component is further configured to display, within the player base frame, a shopping cart with the one or more products or services.

21. The system of claim 13, wherein the one or more computers are configured to transmit or receive at least one of the media content or the interactive e-commerce component.

22. The system of claim 13, wherein the interactive e-commerce component is configured to display content as a transparent overlay over the media content.

23. The method of claim 1, further comprising:
displaying within the player base frame, by the interactive e-commerce component, one or more graphics associated with the one or more products or services;
wherein at least one of initiating the transaction or retrieving the further information is done in response to detecting the user interacting with an area of the player base frame where the one or more graphics are displayed.

24. The method of claim 23, wherein at least some of the one or more graphics do not overlay an area where the media content is displayed in the media content subframe of the player base frame.

25. The method of claim 1, wherein at least some of the display for the further information or at least some of a display for the transaction at least partially overlays an area where the media content is displayed in the media content subframe of the player base frame.

26. The method of claim 1, wherein the interactive e-commence component includes a selectable graphical listing of the one or more products or services.

27. The method of claim 1, further comprising:
retrieving and displaying within the player base frame, by the one or more embed codes, a selectable list of media content; and
upon the user selecting media content from the list, retrieving the interactive e-commerce component based on the e-commerce component being associated with the selected media content.

28. The method of claim 1, further comprising:
displaying within the e-commerce subframe of the player base frame, by the interactive e-commerce component, a shopping cart with the one or more products or services.

29. The system of claim 13, wherein the one or more computers include the first device.

30. The method of claim 1, wherein the interactive e-commerce component is configured to receive an indication, within the player base frame, that a purchase order is approved or denied.

* * * * *